Patented May 22, 1923.

1,455,893

UNITED STATES PATENT OFFICE.

FRANK WEBB STOCKTON, OF PITTSBURGH, PENNSYLVANIA, ASSIGNOR TO ALUMINUM SEAL COMPANY, OF NEW KENSINGTON, PENNSYLVANIA, A CORPORATION OF PENNSYLVANIA.

UNVULCANIZED RUBBER COMPOSITION.

No Drawing.   Application filed November 3, 1921. Serial No. 512,498.

*To all whom it may concern:*

Be it known that I, FRANK W. STOCKTON, a citizen of the United States, and a resident of Pittsburgh, in the county of Allegheny and State of Pennsylvania, have invented a new and useful Improvement in Unvulcanized Rubber Compositions, of which the following is a specification.

This invention has to do with an improved unvulcanized rubber composition adapted for any use requiring such a medium, and particularly one possessing a high degree of stiffness and resilience.

It is an object of the invention to provide an unvulcanized composition which is inexpensive to manufacture, which not only has the desirable qualities of an unvulcanized product such as capability of extrusion, plasticity and adhesiveness, but which also possesses the desirable stiffness, resilience, strength and resistance to oils of vulcanized compositions.

The unvulcanized compositions of the prior art consist of some variety of gum rubber which has been compounded with various inert fillers such as china clay, barytes, asbestos, talc, infusorial earth, and similar materials which give to the rubber a much larger volume but have no action upon it other than the physical one of diluting it. Such admixture of inert substances may compose from thirty to seventy per cent, approximately, of the weight of the composition, the remainder being rubber, rubber-like materials, or organic matter. These compositions are prepared by compounding in a rubber mill or a similar machine and are then generally extruded hot in the desired form.

I have discovered that if in an unvulcanized rubber composition a substantial part or all of the inert filler above mentioned be replaced by certain forms of very finely divided active solids, such for example, as carbon or gas black, there results a product having properties essentially different from the unvulcanized rubber compositions heretofore known. It is well known in the art that the natural resilience of gum rubber is largely destroyed during the process of breaking it down or milling it on rolls and compounding ingredients thereinto. The introduction of the inert mineral ingredients above mentioned in the unvulcanized rubber composition leaves the rubber in the broken down condition with substantially no resilience. I have found that if instead of a substantial part or all of the above mentioned inert mineral fillers, a finely divided active form of solid such as carbon or gas black is used, there takes place some sort of union of this material with the rubber which gives it many of the properties of vulcanized rubber, particularly the properties of resilience and stiffness to an extent dependent upon the proportion of this active filler and rubber. By the use of a sufficient amount of this active ingredient the resilience, stiffness and other desirable properties of this unvulcanized composition may be made comparable to that of a vulcanized composition without losing the desired plasticity and adhesiveness of the unvulcanized composition. Moreover, tests show that the introduction of a substantial amount of this active ingredient so changes the properties of the unvulcanized rubber composition that whereas the best compositions of the prior art are completely disintegrated by a few hours of immersion in oil, my improved composition successfully resists the action of the oil and retains its form and much of its firmness and resilience after months of immersion in oil. The profound change in properties of the rubber appears to be due to some sort of interaction between the active solid particles and the rubber. While I do not limit myself to any particular explanation of this phenomenon I am inclined to think that it is due to an actual adhesion of the rubber to the surfaces of these particles which adhesion may be of the nature of an adsorption, whereas, it is probable that the rubber does not actually adhere to the surfaces of the particles of other and inert fillers but merely surrounds these particles.

As an example of my improved composition, I may compound together in the usual way the following materials:

|  | Pounds. |
|---|---|
| Rubber | 50 |
| Gas black | 30 |
| Inert filler (such as clay, talc, barytes, infusorial earth, cork, etc.) | 18 |
| Softening agent | 2 |

The softening agent may be paraffin, palm oil, fully hydrogenated cotton-seed oil, mineral rubber, or other similar material adapted to facilitate the extrusion of the compound. After the material has been properly compounded, for example, in a rubber mill of the customary type, it is transferred to an extrusion machine, such as is common in the art, where it is extruded at an elevated temperature.

The rubber used may be of any suitable grade or it may be partially admixed with balata, gutta-percha, or similar substances. Other organic compounds such as glue, casein, rubber substitutes, factice, reclaimed rubber or similar materials may be incorporated by means known to the prior art. The amount of added finely divided solid matter may vary from about 15% to 75% by weight of the total composition. This finely divided solid material may consist wholly or in part of gas black, there being preferably present a sufficient quantity of such active material to form at least about 15% of the composition.

The resilience and other desirable properties of the resulting composition depends upon the proportion of this active material to the rubber. If a very large amount of active material is used, the resulting composition may be so stiff as to be unsuitable for extrusion, in which case it may be formed into sheets in a calender. The proportion of rubber and other plastic materials in the compound may vary between about 25% and 85% of the whole, depending upon the properties desired. The inclusion of factice as one of the ingredients produces a product maintaining greater stiffness at high temperatures, that is, one which remains comparatively firm at such temperatures, and it is used in proportions suitable to effect the desired result.

It is thus seen that the invention provides an unvulcanized composition having properties suitable for a number of uses such as mats, flooring, shoe-soles, stoppers, belting, plumbing fittings, tennis balls, sheeting and insulation, in fact, for general purposes in which a high degree of stiffness and resilience is desired.

I claim:

1. An unvulcanized rubber compositic containing crude rubber, an inert fill finely divided active gas black forming n less than about 15% of the composition, a a softening agent.

2. An unvulcanized rubber compositi consisting of about 50% rubber, 30% fin divided active carbon, 18% inert filler and 2% softening agent.

In testimony whereof, I sign my name.

FRANK WEBB STOCKTON.